United States Patent [19]
Chisholm

[11] Patent Number: 5,078,097
[45] Date of Patent: Jan. 7, 1992

[54] AUTOMATIC UNITARY FOOD DISPENSER FOR PETS

[76] Inventor: Ronald Chisholm, 13555 Poplar Hill Rd., Phoenix, Md. 21131

[21] Appl. No.: 403,343

[22] Filed: Sep. 6, 1989

[51] Int. Cl.⁵ .............................................. A01K 5/02
[52] U.S. Cl. ............................... 119/51.13; 119/51.11; 222/650; 222/643
[58] Field of Search ............... 119/51.11, 51.12, 51.13; 222/643, 650

[56] References Cited

U.S. PATENT DOCUMENTS

| | | | |
|---|---|---|---|
| 3,741,162 | 6/1973 | Lopez | 119/51.5 |
| 3,900,007 | 8/1975 | Smith | 119/51.13 |
| 3,946,702 | 3/1976 | Mazzini | 119/51.13 |
| 4,889,077 | 12/1989 | Possis | 119/51.11 |

Primary Examiner—John G. Weiss

[57] ABSTRACT

The present invention relates to a device for metering a unitary food substance, such as a hard dog biscuit, to a pet during time when the pet may be left alone, more particularly, an above ground-level mounted device, which is mounted on, for example, a door, consisting of an outer holder having a bottom opening which is fitted with an insert that creates equal-sized areas for placement of the unitary food substance. Upon rotation, by a continuous turning means, of either the insert or the holder, the bottom opening of the holder becomes sequentially positioned directly underneath the each unitary food substance holding area causing the unitary food substance to fall to the ground at various times.

11 Claims, 6 Drawing Sheets

AUTOMATIC UNITARY FOOD DISPENSER FOR PETS

PATENT DOCUMENTS AND PUBLICATIONS

| | | |
|---|---|---|
| 505,415 | Weller, Jr., W. L. | 9/1983 |
| 2,500,243 | Dixon, E. B. | 3/1950 |
| 3,741,162 | Lopez, A. R. | 6/1973 |
| 4,492,183 | Chiotasso, P., et al | 1/1985 |

BACKGROUND OF THE INVENTION

In the prior art, of which we are aware, various automatic pet food servers have been patented for use with bulk pet food. However, none of these devices provide for easily dosing a unitary food substance, that is, a pet snack of a small, singular nature, such as a dog biscuit for a dog's teeth.

The prior art pet food dispensers, of the cylindrical pet food dispenser type, exhibit problems and difficulties. These devices invariably consists of a turning means for intermitent turning, at intervals, and compartments which hold the food. In one prior art device, there is provided a hopper which is divided into compartments. Various devices show either a bottom or top opening, oriented above or below the pet food, for removal of the food substance.

The top removal prior art devices had to be of sufficiently size to permit access by the animal with its mouth. This required that the compartments, and the overall device, be large. These devices are bulky. Moreover, it is difficult to clean the compartment corners and smaller areas where dirt and debris can collect.

There is also shown in the prior art a bottom oriented discharging device, but this device required a conveying means to a remotely located feed area. Because the turning mechanism was also oriented below the device, the device required a side discharge of the granular food so as to avoid the turning mechanism while maintaining the food integrity.

In the past, various turning means were used. In one example, the turning attachment consists of a bottom spring device, while another provides for a side mounted turning device, and still another has a bottom mounted electric programmer. The turning means had to be designed in a manner that would provide for the entire compartment to be opened at substantially one time, so as to provide all of the allotted food to the animal at the designated feeding time.

All of the prior art devices are used at floor level, and must be of a suitable closure and strength to withstand attempts by a pet to break it open.

These prior art disclosures suffer from a number of inherent deficiencies and disadvantages for application to a feeding of a unitary substance. First, the devices are used at ground level and the integrity of the device may be compromised by the pet depending on the strength of the animal and its ability to penetrate the outer covering of the device. If the animal is sufficiently strong, it will be able to break into the hopper compartments and empty the contents of the feeder.

In addition, because the food substance is not unitary, the device must align on intervals, and not turn continuously because the feeding times of the animal are at intervals, and not of a continuous nature. Further, the alignment needs to be precise so that all of the food is distributed to the animal at the necessary time.

These dispensers must either direct a food substance, which is non-unitary, to a dish or tray, or provide a hopper of sufficient size that it can be used as a dish, for the animal. In the past, cylindrical feeders had to either provide enough room for the animal to access the feeding receptacle with its mouth, or it must provide for removal of the non-unitary food to a remote location. In the first instance, the food storage cubicles cause the device to be large and bulky. To provide the top access necessary, the turning mechanism must be either to the side or below the compartments. For bottom discharge, none of the devices provide for an unobstructed gravity fall to the ground but instead must provide a mechanism to direct the food to a remote location thereby increasing the number of parts and the complexity of the design. While the earlier feeder provide for intermitent feeding of food to an animal, these feeders are greatly different in the complexity of design required, which has a negative impact on their reliability, convenience, and food packaging requirements, which is reflected in the cost and ability to manufacture and in the marketing features.

SUMMARY OF THE INVENTION

This automatic unitary food dispenser for pets of the present invention is a simple, low-cost device which accomplishes a reliable dosing of a unitary food substance, such as a snack, for pets. The unitary food substance presented to the animal for its consumption at a timed interval. This presentation can take place on the floor, on the ground, or at any other low level that the animal can reach. Since the unitary food substance does not have to be directed to a particular location, there is no need for a directional mechanism. As the animal does not need to feed from a dish or tray, none is provided. Because the food substance is discharged downwardly in an unobstructed path to the ground, access to the present invention by the animal is not necessary. Moreover, the device does not have to be able to withstand attack by the animal because it is mounted above the ground and away from the animal's reach.

The present invention provides a self-contained timing mechanism which turns at a preset rate over a period of time, and dosing of the unitary food substance is determined by how many of the compartments are filled by the owner.

Accordingly, it is an object of this invention to provide an above ground automatic unitary food dispenser with relatively few operating parts.

Still another object of this invention to provide an above ground automatic unitary food dispenser which is located above the highest point of access of the pet.

It is a further object of this invention to provide an above ground automatic unitary food dispenser which does not have to be reinforced to withstand an attack by a pet.

Another object of this invention is to provide an above ground automatic unitary feed which includes a rotatable insert having a plurality of small food compartments for dispensing a unitary food substance such as an animal snack at preselected times.

Yet an additional object of this invention to provide an above ground automatic unitary food dispenser which has a self contained turning mechanism.

It is a further object of this invention to provide an above ground automatic unitary food dispenser with an bottom discharge that does not require transfer of the food substance to a remote location.

The characteristics and advantages of this invention are referred to in connection with the attached drawings, and represent one embodiment of this invention. Variation may be made without departure from the principles disclosed and are considered part of this invention if properly within the scope of the claims.

BRIEF DESCRIPTION OF THE DRAWINGS

The present invention will be shown hereinbelow in a preferred embodiment in FIGS. 1 to 14 of the attached drawings, which show.

DESCRIPTION OF THE PREFERRED EMBODIMENTS

Figure 1:
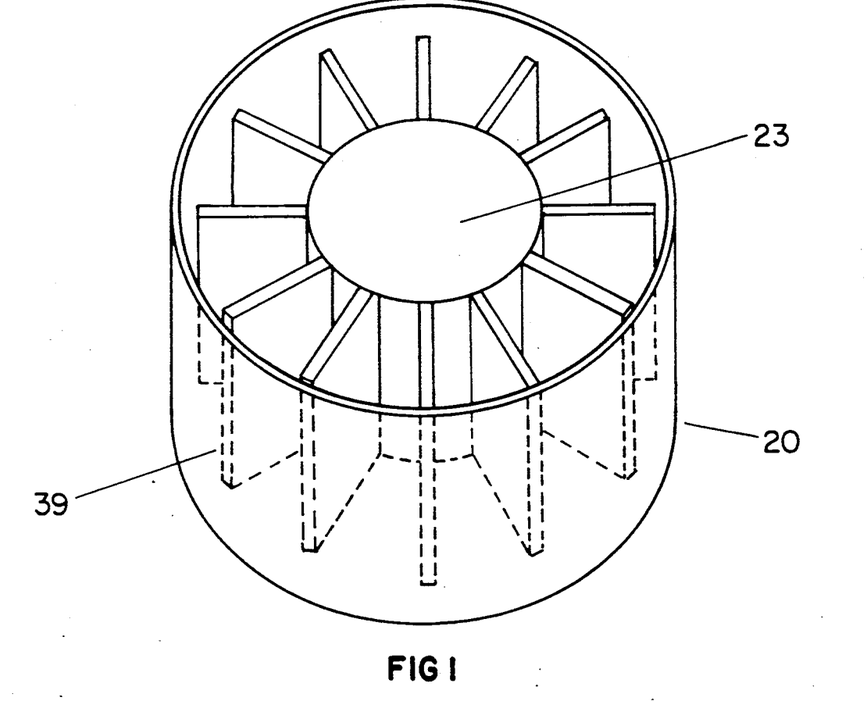
FIG. 1, a top perspective view of the holder with insert.
Figure 2:
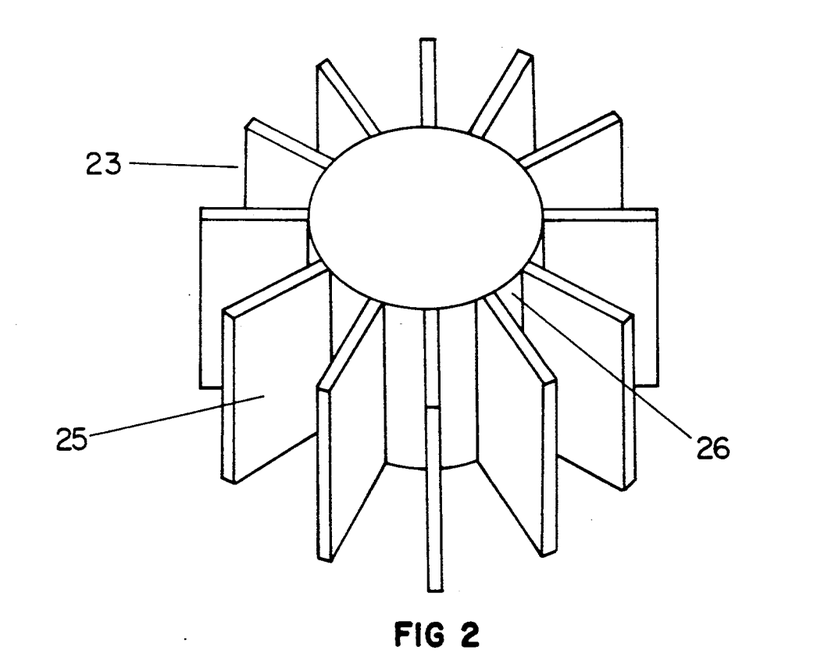
FIG. 2, a top perspective view of the insert alone.
Figure 3:
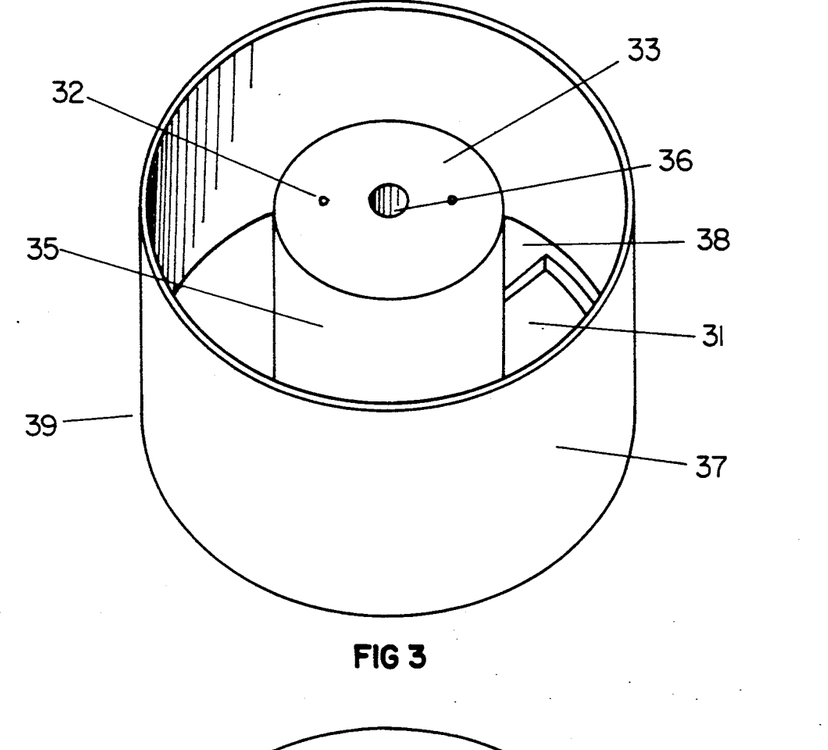
FIG. 3, top perspective view of the holder alone.
Figure 4:
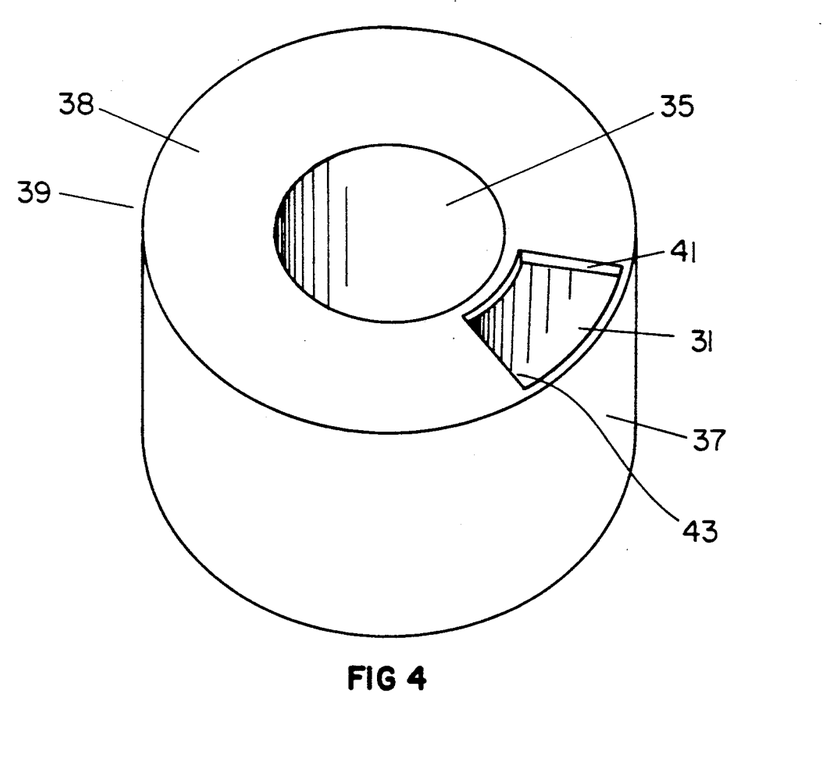
FIG. 4, a bottom perspective view of the holder alone.
Figure 5:
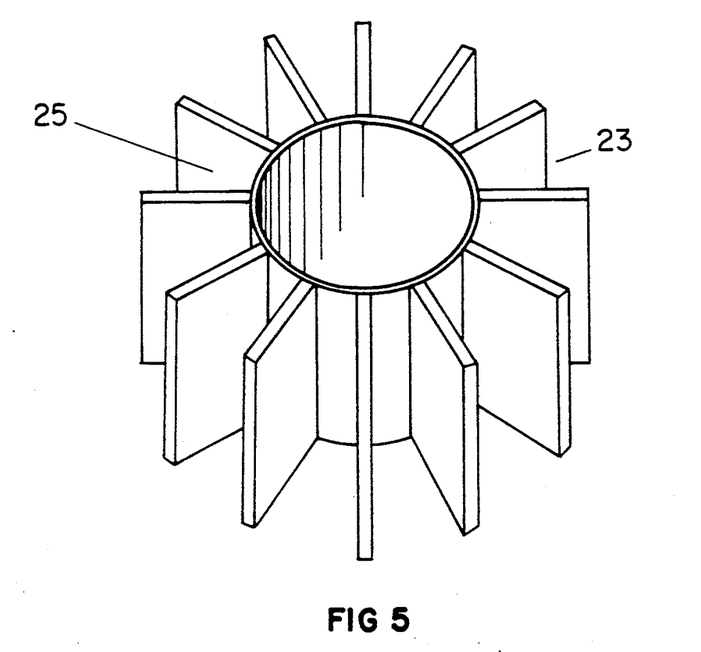
FIG. 5, a bottom perspective view of the insert alone.
Figure 6:
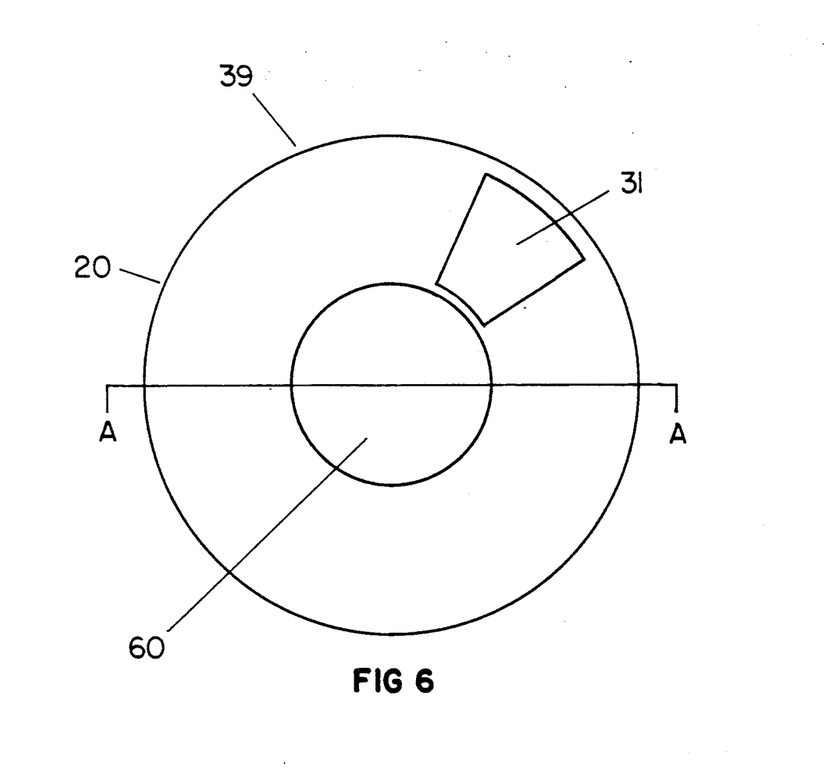
FIG. 6, a bottom view.
Figure 7:
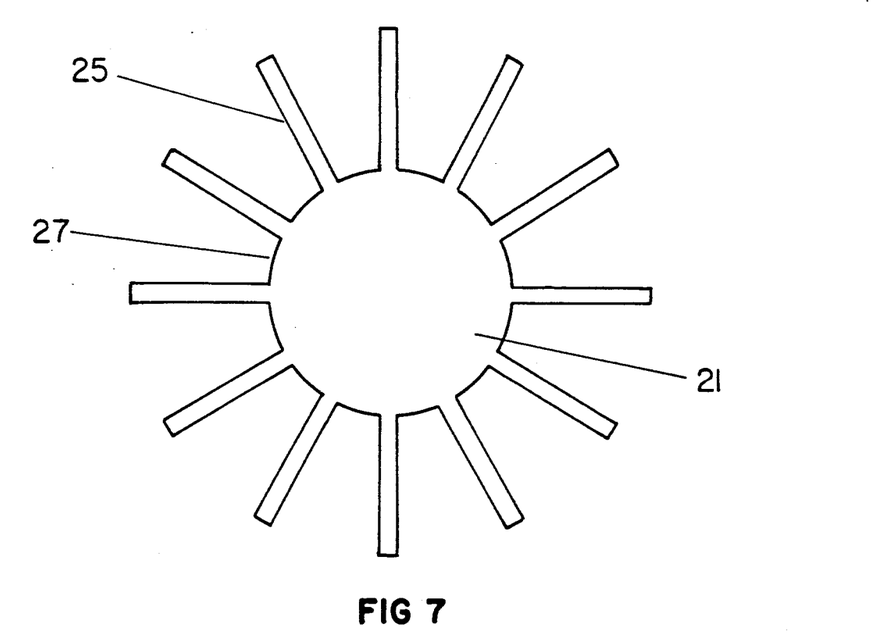
FIG. 7, a top view of the insert.
Figure 8:
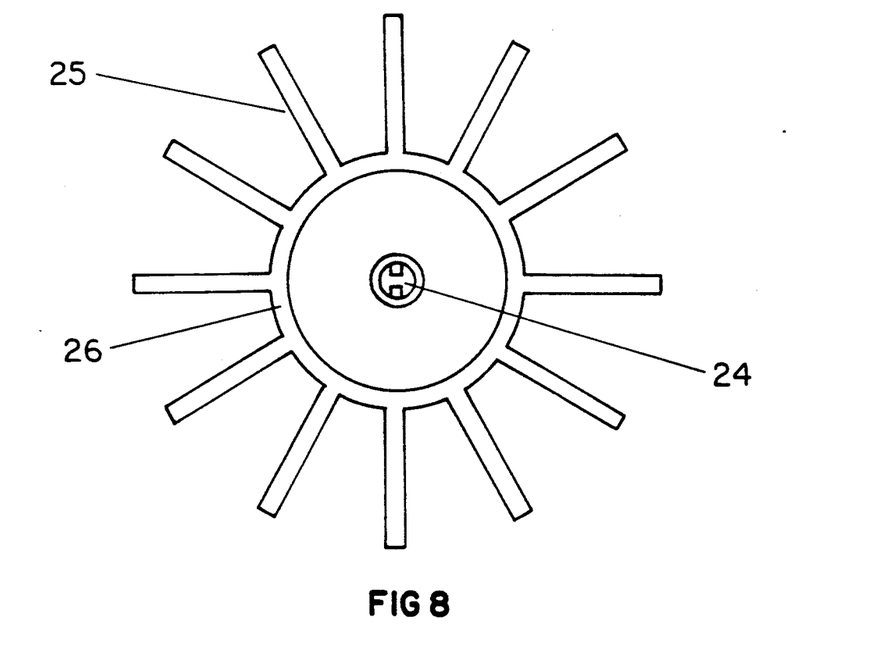
FIG. 8, a bottom view of the insert.
Figure 9:
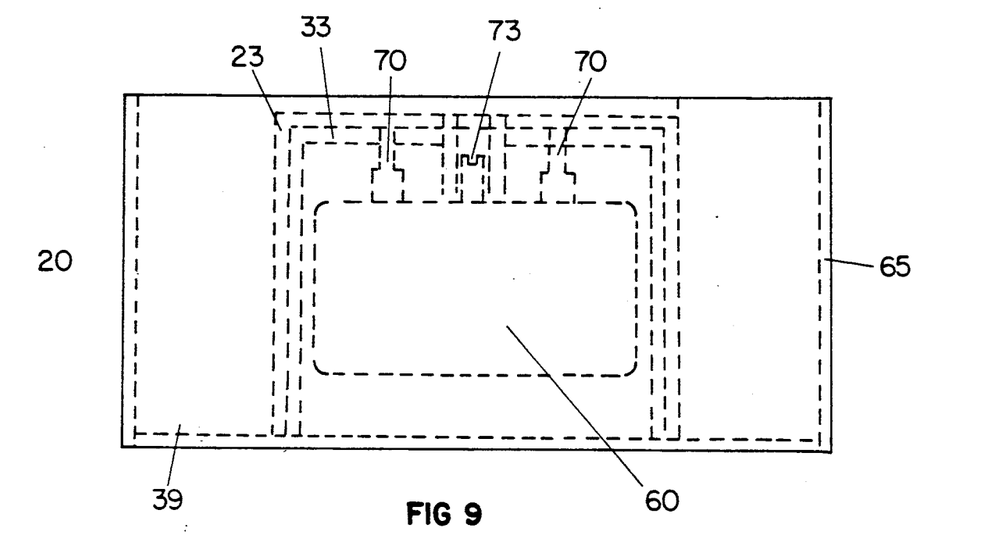
FIG. 9, section A—A of FIG. 6.
Figures 13, 14:
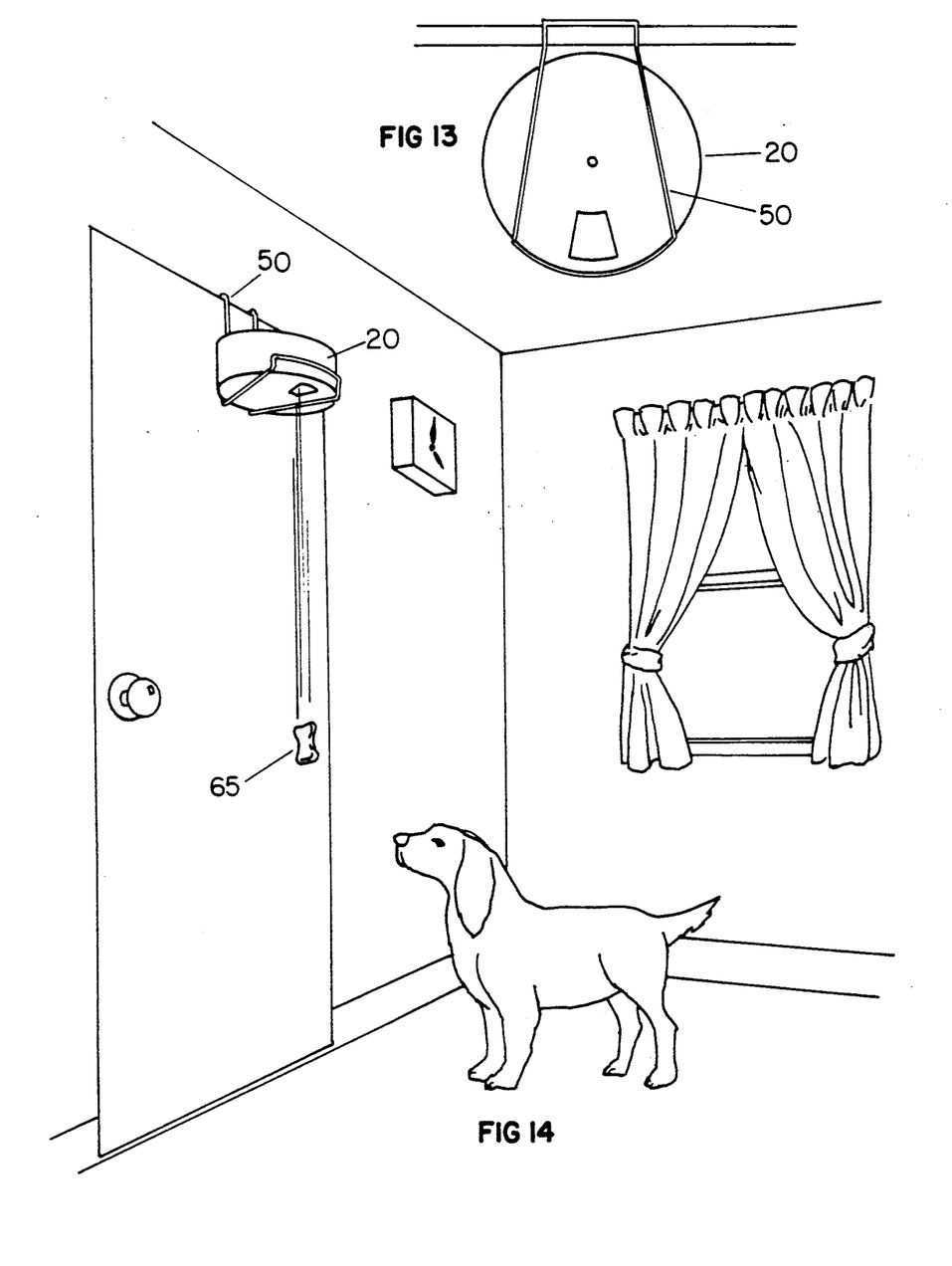
FIG. 13, a bottom view of the above ground automatic snack dispensing device with the bracket.
FIG. 14 a perspective view of the above ground automatic snack dispensing device with the bracket.

The present invention concerns an above ground automatic snack dispensing device 20 for dispensing of a unitary food substance as shown in FIG. 1 and FIG. 14. This device 20 is comprised of a holder 39 of cylindrical shape as shown in FIGS. 1, 3 4, 6, 9 and 10, an insert 23, shown in FIGS. 1, 2, 5, 7 and 8 which fits into the holder 39, and which is held by a bracket 50 as shown in FIGS. 11, 12, 13 and 14. Referring now to FIGS. 3 and 4, the holder 39 has a cylindrical inner member 35 and a cylindrical outer member 37 of the same height, connected therebetween by a flat bottom member 38 fixed to the downward edges of the cylindrical inner and outer members 35 and 37 and continuously therebetween in a plane perpendicular to said inner and outer members 35 and 37, said bottom member 38 having a truncated pie shaped opening 31 which straight sides of the opening 41 and 43 are spaced substantially the same distance apart as the spokes 25 of the insert 23 as shown in FIG. 2. In FIG. 9 it is shown that the hollow inside of the inner member 35 is the preferred location for the turning means 60. In FIG. 3, there is shown the top 33 of the holder 39. The top 33 is of a circular shape. The outer edge of the top 33 is connected to the top edge of the cylindrical inner member 35. The top 33 of the holder 39 is provided with a central hole 36 and at least one screw hole 32.

Referring to FIGS. 1, 2, 5, 7 and 8, the insert 23 fits into, and moves freely within the holder 39 between the inner and outer members 35 and 37. The insert 23 is provided with a hollow cylinder hub member 26 of slightly larger diameter than than the inner member 35 of the holder 39 and the hollow cylinder hub member 26 fits around said inner member 35 of the holder 39, said hollow cylinder hub member 26 having spokes 25 which are rectangularly shaped, whose inner edges 27 join the hub member 26, are of a distance therebetween sufficiently for space for a unitary food substance, and which each radiate outward from said hub member 26 to the inside of the outer member 37 of the holder 39. The insert 23 has a top 21 which is circular, and which connects to the hollow cylinder hub member 26 at its top edge. In a preferred embodiment, the spokes 25 are equidistant therebetween and are in a plane perpendicular to a plane tangent to said hollow cylinder hub member 26.

Figure 10:
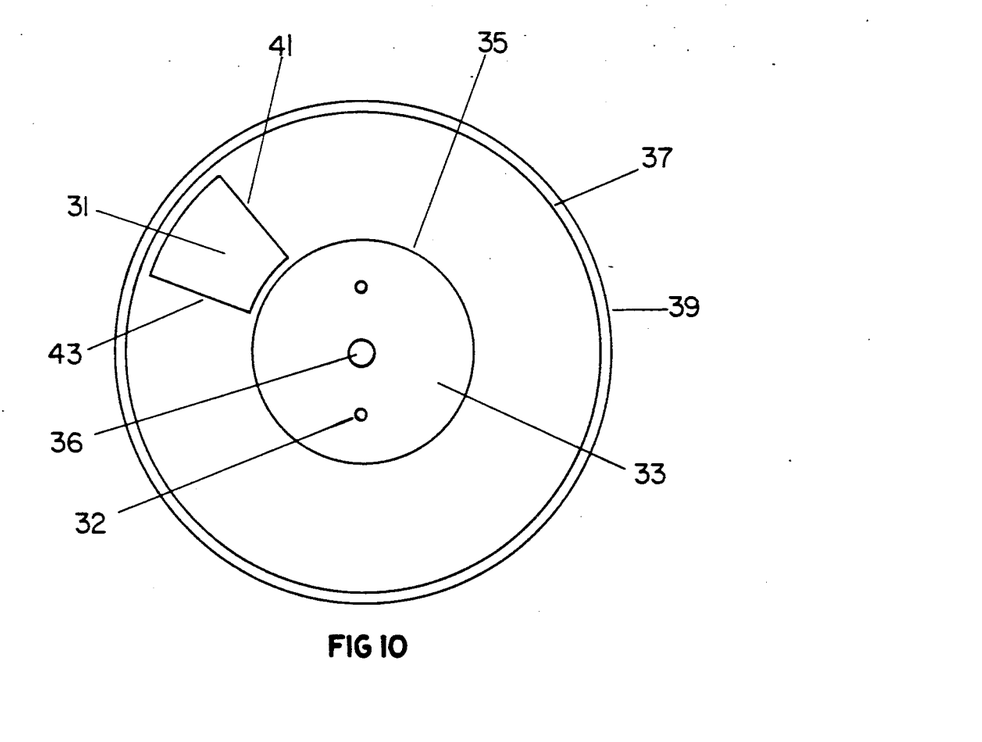
FIG. 10, a top view of the holder.
Figure 11:
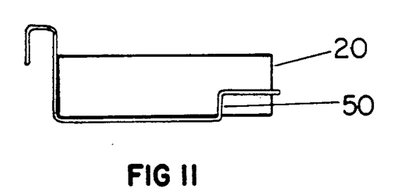
FIG. 11, a side view of the above ground automatic snack dispensing device with the bracket.
Figure 12:
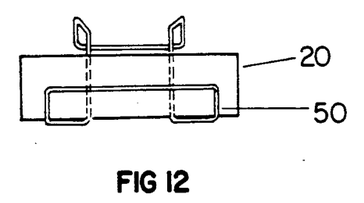
FIG. 12, a side view of the above ground automatic snack dispensing device shown in FIG. 11 and rotated 90°, and shown with the bracket.

Referring to FIGS. 9 and 10, there is shown a typical means 73 for connecting a continuously turning means which turns the insert 23 about the central common axis of the insert 23 and the holder 39. The central hole 36 permits the shaft 73 of the turning means 60 to pass through the top 33 and connect to the connecting means 24 of the insert 23 which is located on the bottom side of the top 21 of the insert 23 as shown in FIG. 8. In FIG. 9 there is shown at least one screw shaft 70 for fixedly attaching the turning means 60 to the bottom side of the top 33 of the holder 39. In a preferred embodiment, the turning means is a spring activated time which is wound by turning the insert 23. After winding, the turning means 60 causes the insert 23 to turn in the holder 39. The insert 23 turns until it causes a food compartment, which is formed by the space between the spokes 25, to align over the truncated pie shaped opening 31, thereby downwardly releasing a unitary food substance 65 which falls through the truncated pie shaped opening 31 in the bottom of the holder 39 unobstructedly to the ground.

In another embodiment the turning means turns the holder 39 and the insert 23 remains stationary.

Because the feeding times of the unitary food substance do not have to be exact, it is possible to use a simple spring release timer, similar to an egg timer, or hour timer, or the like. In one embodiment, the timer causes the insert to rotate one revolution in twelve hours. When the unitary food substance 65 aligns over the truncated pie shaped opening 31 sufficiently, it releases the unitary food substance 65. This alignment occurs at least once an hour but the time between each alignment may vary due to the position of the unitary food substance 65 within the compartment.

In FIGS. 11, 12, 13, and 14 there is shown the above ground automatic snack dispensing device 20 with the bracket 50 for mounting the device above ground level. In FIG. 14 the above ground automatic snack dispensing device 20 is shown mounted on the back of a door.

What is claimed is:

1. A device for automatically dispensing a unitary food substance for pets comprising:

an above ground-level mounting means a holder of cylindrical shaped which has a cylindrical inner member and a cylindrical outer member, connected therebetween by a flat bottom member fixed to the downward edges of the cylindrical inner and outer members and continuously therebetween in a plane perpendicular to said inner and outer members, said bottom member having an opening for passing through a unitary food substance an insert that fits into, and moves freely within the holder between the inner and outer members, and which has a hollow cylinder hub member of slightly larger diameter than the inner member of the holder and fits around said inner member of the holder, said hollow cylinder hub member having spokes which are rectangularly shaped, whose inner edges join the hub member, are distanced therebetween sufficiently for space for a unitary food substance, and which each radiate outward from said hub member, and a means for continuously repositioning the holder relative to the insert whereby the unitary food substance is caused to fall through said opening in the bottom of the holder unobstructedly to the ground.

2. A device for automatically dispensing a unitary food substance for pets as recited in claim 1, wherein said means for turning is a mechanical timer.

3. A device for automatically dispensing a unitary food substance for pets as recited in claim 1 wherein said spokes are equally distanced therebetween.

4. A device for automatically dispensing a unitary food substance for pets as recited in claim 1 wherein said spokes each radiate outward from said hub member to the inside of the outer member of the holder in a plane perpendicular to a plane tangent to said hollow cylinder hub member.

5. A device for automatically dispensing a unitary food substance for pets as recited in claim 2, wherein said mechanical timer causes the insert to turn one revolution in twelve hours.

6. A device for automatically dispensing a unitary food substance for pets as recited in claim 1, wherein said above ground mounting means is a door hanger.

7. A device for automatically dispensing a unitary food substance for pets as recited in claim 1, wherein said opening for passing through a unitary food substance is a truncated pie shaped opening which straight sides of the opening are spaced substantially the same distance apart as the spokes of the insert.

8. A method for automatically dispensing a unitary food substance for pets comprising:

mounting a holder of cylindrical shape which has a cylindrical inner member and a cylindrical outer member, connected therebetween by a flat bottom member fixed to the downward edges of the cylindrical inner and outer members and continuously therebetween in a plane perpendicular to said inner and outer members, said bottom member having an opening for passing through a unitary food substance providing an insert that fits into, and moves freely within the holder between the inner and outer members, and which has a hollow cylinder hub member of slightly larger diameter than the inner member of the holder and fits around said inner member of the holder, said hollow cylinder hub member having spokes which are rectangularly shaped, whose inner edges join the hub member, are distanced therebetween sufficiently for space for a unitary food substance, and which each radiate outward from said hub member, and placing a unitary food substance in the spacing between the spokes of the insert repositioning the holder relative to the insert thereby causing the unitary food substance to fall through said opening in the bottom of the holder unobstructedly to the ground.

9. A method for automatically dispensing a unitary food substance for pets comprising:

mounting a holder of cylindrical shape which has a cylindrical inner member and a cylindrical outer member, connected therebetween by a flat bottom member fixed to the downward edges of the cylindrical inner and outer members and continuously therebetween in a plane perpendicular to said inner and outer members, said bottom member having an opening for passing through a unitary food substance providing an insert that fits into, and moves freely within the holder between the inner and outer members, and which has a hollow cylinder hub member of slightly larger diameter than the inner member of the holder and fits around said inner member of the holder, said hollow cylinder hub member having spokes which are rectangularly shaped, whose inner edges join the hub member, are distanced therebetween sufficiently for space for a unitary food substance, and which each radiate outward from said hub member, and placing a unitary food substance in the spacing between the spokes of the insert repositioning the insert relative to the holder thereby causing the unitary food substance to fall through said opening in the bottom of the holder unobstructedly to the ground.

10. An automatically unitary food substance dispensing device for pets comprising:

a holder means of cylindrical shaped having a cylindrical inner member and a cylindrical outer member integrally connected therebetween at the downward edges by a flat bottom member, said bottom member having an opening for passing through a unitary food substance;

an insert means for insertion into said holder means, said insert means capable of turning freely within the holder between the inner and outer embers, and having a hub member of slightly larger diameter than the inner member of the holder means for fitting around said inner member of said holder means, said hub member having spokes with inner edges joining said hub member, said spokes radiating outward and distanced therebetween sufficiently for space for a unitary food substance;

repositioning the holder relative to the insert causing the unitary food substance to fall through said opening in the bottom of said holder unobstructedly to the ground; and an above ground-level mounting means.

11. An automatically unitary food substance dispensing device for pets comprising:

a holder means of cylindrical shaped having a cylindrical inner member and a cylindrical outer member integrally connected therebetween at the downward edges by a flat bottom member, said bottom member having an opening for passing through a unitary food substance;

an insert means for insertion into said holder means, said insert means capable of turning freely within the holder between the inner and outer members, and having a hub member of slightly larger diameter than the inner member of the holder means for fitting around said inner member of said holder means, said hub member having spokes with inner edges joining said hub member, said spokes radiating outward and distanced therebetween sufficiently for space for a unitary food substance;

a means for continuously repositioning the insert relative to the central common axis of the insert and the holder causing the unitary food substance to fall through said opening in the bottom of said holder unobstructedly to the ground; and an above ground-level mounting means.

* * * * *